United States Patent [19]

Donnelly et al.

[11] Patent Number: 5,716,658

[45] Date of Patent: *Feb. 10, 1998

[54] PROCESS OF FORMING DOUGH ON A CORRUGATED PAPERBOARD PREFORM

[75] Inventors: Davis A. Donnelly; Harry K. Kralkow, both of Eau Claire; Larry L. Kufahl, Wausau, all of Wis.; Thomas W. Fester, Glendale Heights, Ill.

[73] Assignee: Dadco Diversified, Inc., Eau Claire, Wis.

[ * ] Notice: The term of this patent shall not extend beyond the expiration date of Pat. No. 5,503,860.

[21] Appl. No.: 500,465

[22] Filed: Jul. 10, 1995

Related U.S. Application Data

[63] Continuation-in-part of Ser. No. 268,998, Jun. 30, 1994, Pat. No. 5,503,860.

[51] Int. Cl.$^6$ ..................... A21C 11/00
[52] U.S. Cl. ............... 426/420; 426/132; 426/389; 426/391; 426/414; 426/496; 426/512; 425/127
[58] Field of Search ................... 426/94, 128, 132, 426/389, 391, 420, 414, 496, 512, 502; 425/112, 127

[56] References Cited

U.S. PATENT DOCUMENTS

| | | | |
|---|---|---|---|
| 787,274 | 4/1905 | Burns . | |
| 2,407,118 | 9/1946 | Waters | 93/49 |
| 2,757,093 | 7/1956 | Starzyk | 99/171 |
| 2,774,316 | 12/1956 | Daino | 107/54 |
| 3,190,758 | 6/1965 | Hauf | 99/172 |
| 3,202,114 | 8/1965 | Cameron et al. | 107/54 |
| 3,934,308 | 1/1976 | Neri | 17/32 |
| 3,958,910 | 5/1976 | Wilde | 425/127 |
| 4,176,591 | 12/1979 | Power | 99/430 |
| 4,184,421 | 1/1980 | Ahlgren | 99/450 |
| 4,251,549 | 2/1981 | Fournet et al. | 426/19 |
| 4,271,200 | 6/1981 | Hempenius et al. | 426/27 |
| 4,303,677 | 12/1981 | DeAcetis | 426/27 |
| 4,337,116 | 6/1982 | Foster et al. | 162/158 |
| 4,362,497 | 12/1982 | Lifshitz | 425/510 |
| 4,367,243 | 1/1983 | Brummett et al. | 426/303 |
| 4,376,243 | 3/1983 | Renn et al. | 219/514 |
| 4,464,405 | 8/1984 | De Christopher | 426/391 |
| 4,511,324 | 4/1985 | Bauer | 425/398 |
| 4,539,213 | 9/1985 | Cherkasky et al. | 426/456 |
| 4,563,946 | 1/1986 | Barlow et al. | 99/450 |
| 4,634,365 | 1/1987 | Triporo et al. | 425/398 |
| 4,644,858 | 2/1987 | Liotto et al. | 99/449 |
| 4,676,151 | 6/1987 | Gorsuch et al. | 99/450 |
| 4,696,823 | 9/1987 | DeChristopher | 426/496 |
| 4,785,968 | 11/1988 | Logan et al. | 220/410 |
| 4,911,634 | 3/1990 | Keener | 425/412 |
| 4,973,240 | 11/1990 | Reilly | 425/195 |
| 5,074,778 | 12/1991 | Betts, Jr. et al. | 425/394 |
| 5,139,405 | 8/1992 | Krone et al. | 425/116 |
| 5,176,922 | 1/1993 | Balsano et al. | 425/89 |
| 5,204,125 | 4/1993 | Larsen | 425/298 |
| 5,331,135 | 7/1994 | Ovadia | 426/243 X |
| 5,503,860 | 4/1996 | Donnelly et al. | 426/420 |

*Primary Examiner*—Milton Cano
*Attorney, Agent, or Firm*—Lathrop & Clark

[57] ABSTRACT

To facilitate baking a frozen dough product in an oven having a rack formed of aligned bars, the dough product is formed over an oven-safe paper sheet which has a plurality of die-cut holes. This sheet serves as a baking substrate and obviates the need for a baking pan. The paper sheet is formed with the dough product, and the dough extends through the holes and locks the sheet to the dough. The end user may thus remove the frozen dough product together with the sheet from a backing preform and place the assembly on an oven rack for baking. As the dough thaws the crust will loose its stiffness. The sheet however, will prevent the more pliable crust from distending through the oven rack before the dough has become baked and rigid. The sheet forms a backing which restrains flow of the dough, while at the same time the holes permit the escape of gases from the bottom of the crust and ensure uniform baking. Furthermore, the holes allow direct radiant heating of the dough product through the paper sheet. The position and size of the holes may be adjusted to achieve desired uniformity of baking of the dough product. The finished baked dough product, such as dinner rolls or a pizza crust, may be removed from the oven with the sheet attached thereto, and the baked dough product may be served directly from the sheet.

11 Claims, 7 Drawing Sheets

PROCESS OF FORMING DOUGH ON A CORRUGATED PAPERBOARD PREFORM

This is a continuation-in-part of application Ser. No. 08/268,998, filed Jun. 30, 1994 now U.S. Pat. No. 5,503,860.

FIELD OF THE INVENTION

The present invention relates to dough baked goods and baking accessories in general, and in particular to preformed dough foodstuffs prepared for cooking and consumption at a later time and articles for assisting in the baking of such foodstuffs.

BACKGROUND OF THE INVENTION

Freshly baked bread products have long been enjoyed by home consumers and restaurant patrons. Preparing pastries and bread products such as pizza crusts and rolls, however, requires ready supplies of perishable materials, skill, and most importantly, time. To minimize meal preparation times, home consumers have a need for preformed, frozen dough products which may be placed in the consumer's home oven and baked for consumption. Likewise, to reduce labor costs and order preparation times, restaurants and pizzerias have a need for preformed bread products, in particular pizza crusts, which will allow the rapid preparation of meals to order.

In the past, pizza crusts have been supplied to pizza makers and other users as prebaked, preformed frozen or refrigerated crusts, with the cheese and other toppings being added to the crust at the time of baking or processing for further sale. Pizza crusts of this sort were typically formed by a die-stamping or sheeting process. In one process, the crusts were baked within a retaining ring or platen, and then packaged. By partially or completely baking the product prior to removal from the baking pan the desired molded shape was preserved. A drawback of prebaked bread products is that the final article is twice-baked and does not retain the moist rich texture and taste of a freshly-baked product.

An attempt to preserve at least a semblance of freshness has been made by providing pizza crusts with a central portion which is unbaked and frozen. The unbaked preformed central portion when baked will rise a certain amount, and provides an improved texture and taste, although still short of that of a freshly baked dough.

Frozen dough products when placed in a consumer's oven may deform over the parallel bars of the oven rack and be subjected to uneven baking. However, baking on a solid tray or pan may restrict the escape of gases from the dough, and inhibit ideal baking conditions.

What is needed is a preformed dough product such as a pizza crust which may be shaped to a desired shape and delivered in frozen form to an end user for baking in an oven such that the product retains its shape and baking qualities.

SUMMARY OF THE INVENTION

The bread products and pizza crusts of the present invention are formed of proofed dough which is molded to a desired shape and frozen on a paperboard preform without being subjected to baking, allowing a frozen bread product to be formed in which the yeast has not been killed. An oven-safe perforated paper baking substrate is positioned between the dough and the preform, and when the dough is pressed and formed onto the preform, the baking substrate is engaged with the dough. The assembly of dough, baking substrate and preform is then packaged and frozen for delivery. The bread product consumer removes the frozen dough product and attached baking substrate from the preform and positions them together in an oven on the bars of an oven rack. The oven-safe paper sheet prevents the dough product from distortion on the oven rack bars, while the perforations allow the escape of gases from the underside of the dough product, enabling proper baking. Furthermore, the perforations are positioned to allow preferential radiant heating to particular regions of the baking product, to control relative baking rates and assure even baking of a nonuniform product.

It is an object of the present invention to provide a frozen dough product assembly which may be placed directly in an oven for baking without the need for a pan.

It is another object of the present invention to provide a frozen dough product assembly which retains the shape of the dough product when baked on an oven rack.

It is a further object of the present invention to provide a dough product assembly which allows gases to escape from all sides of the product when baked in an oven.

It is an additional object of the present invention to provide an article for controlling the radiant heat transmitted to a dough product within an oven to thereby selectibly control the baking of the product across variant regions.

Further objects, features and advantages of the invention will be apparent from the following detailed description when taken in conjunction with the accompanying drawings.

DESCRIPTION OF THE PREFERRED EMBODIMENTS

Figure 1:
FIG. 1 is a cross-sectional view of a pizza crust tray.
Figure 6:
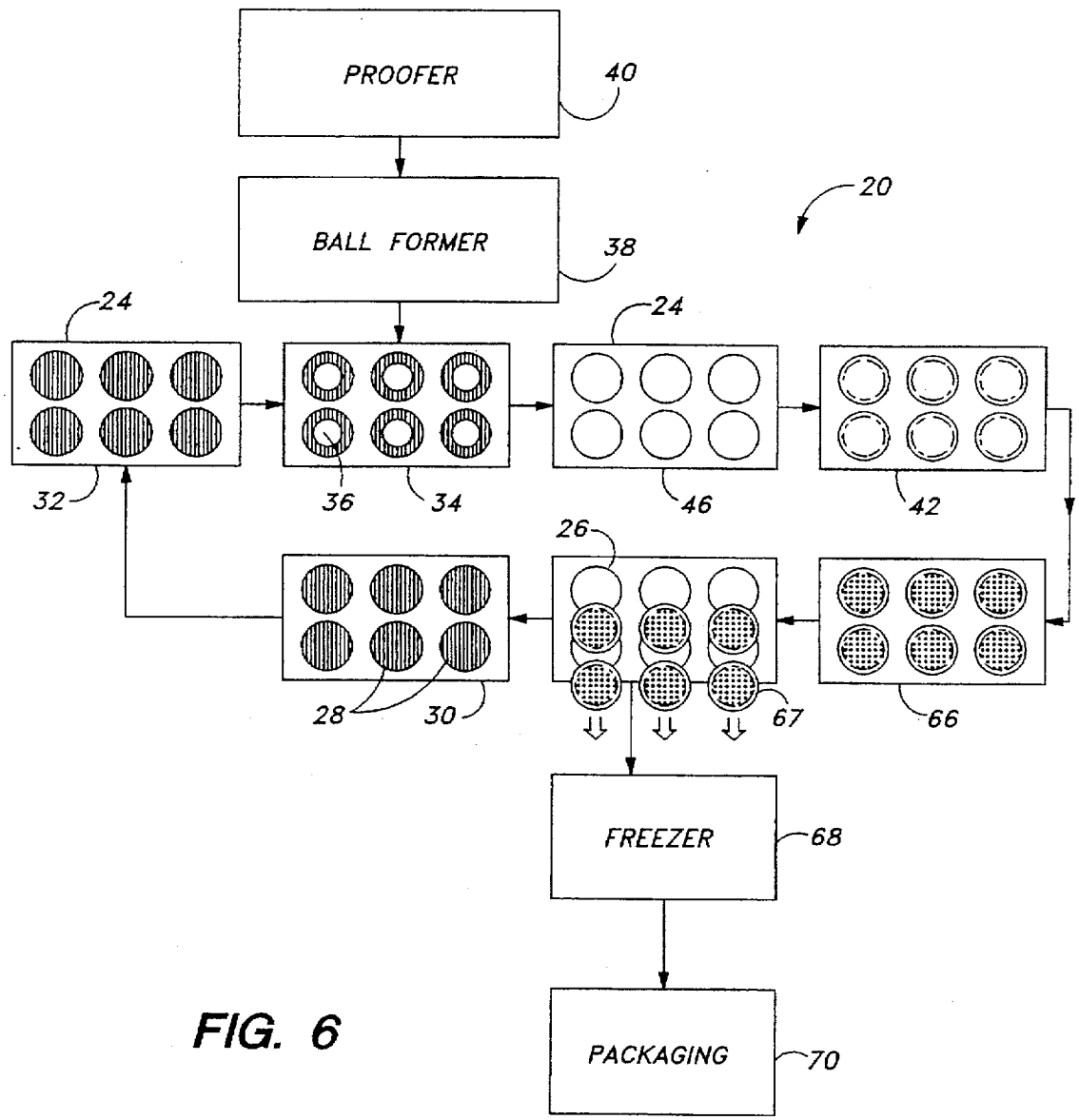
FIG. 6 is a flow chart illustrating the dough forming process of this invention.
Figure 7:
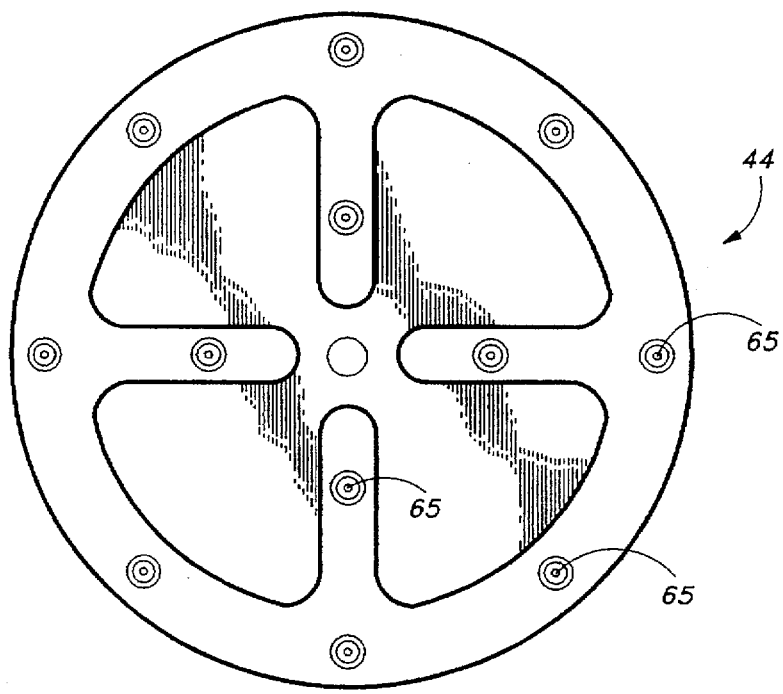
FIG. 7 is a top plan view of the dough-forming die of FIG. 4.

Referring more particularly to FIGS. 1–15, wherein like numbers refer to similar parts, a pizza crust forming apparatus 20 is shown schematically in FIG. 6. Pizza crusts 22 are formed in platens or trays 24, which may be conveyed around a looped path by conventional means, such as hydraulic or pneumatically actuated pusher arms. Each tray 24, as shown in FIG. 1, has an array of circular openings 26 which accept corrugated paperboard preforms 28 therein. The openings 26 are blind holes which are formed in the tray 24, and glow an array of preforms 28 to be conveyed simultaneously. The blind holes have sidewalls 52 which surround the preforms. The trays 24 are preferably formed of plastic such as Teflon or other low friction material. The pusher arms are actuated intermittently to advance the trays 24 in steps, with pauses between tray motions for operation of the apparatus on the preforms 28 and dough deposited thereon.

As shown in FIG. 6, circular corrugated preforms 28 are loaded into the trays 24 at a loading station 30. The preforms 28 may be manually set in position, or may be dropped into place by an automatic dispenser. From the loading station 30, the trays 24 are conveyed to a spray station 32 where a vegetable oil is sprayed on to the preforms 28 to facilitate later release of the crust 22 from the preform 28.

Figure 13:
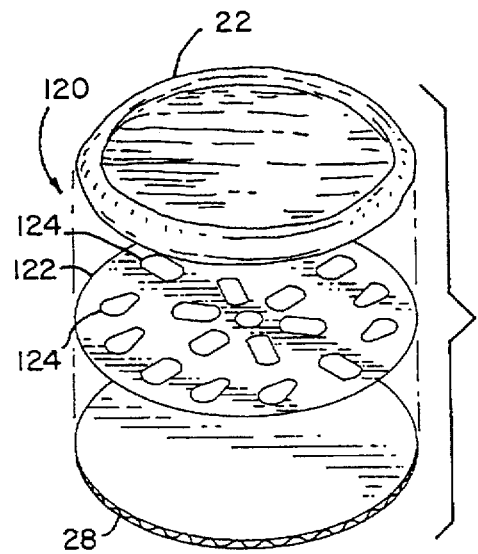
FIG. 13 is an exploded isometric view of the baking substrate sheet which is positioned between the preform and crust and molded into the crust for support of the baking dough product on an oven rack.

To facilitate baking of the crust or other dough product of this invention in an oven having racks formed of aligned bars, the dough product 22, such as the crust shown in FIG. 13, is formed over an oven-safe paper sheet 122 which later serves as a baking substrate. The paper sheet 122 is of a conventional oven-safe paper, such as is commonly used with microwaved food products. For example, the paper may be 13 to 15 thousandths of an inch thick SBS (solid bleached sulfate) paper with a ½ mil lamination of polyester material on one side, the polyester being heat-laminated to the paper. The laminate will withstand a range of temperatures, going from less than freezing to 475° F. All materials should be FDA approved. The polyester or other top surface serves as a release layer to facilitate removal of the baked product from the substrate.

Figure 14:
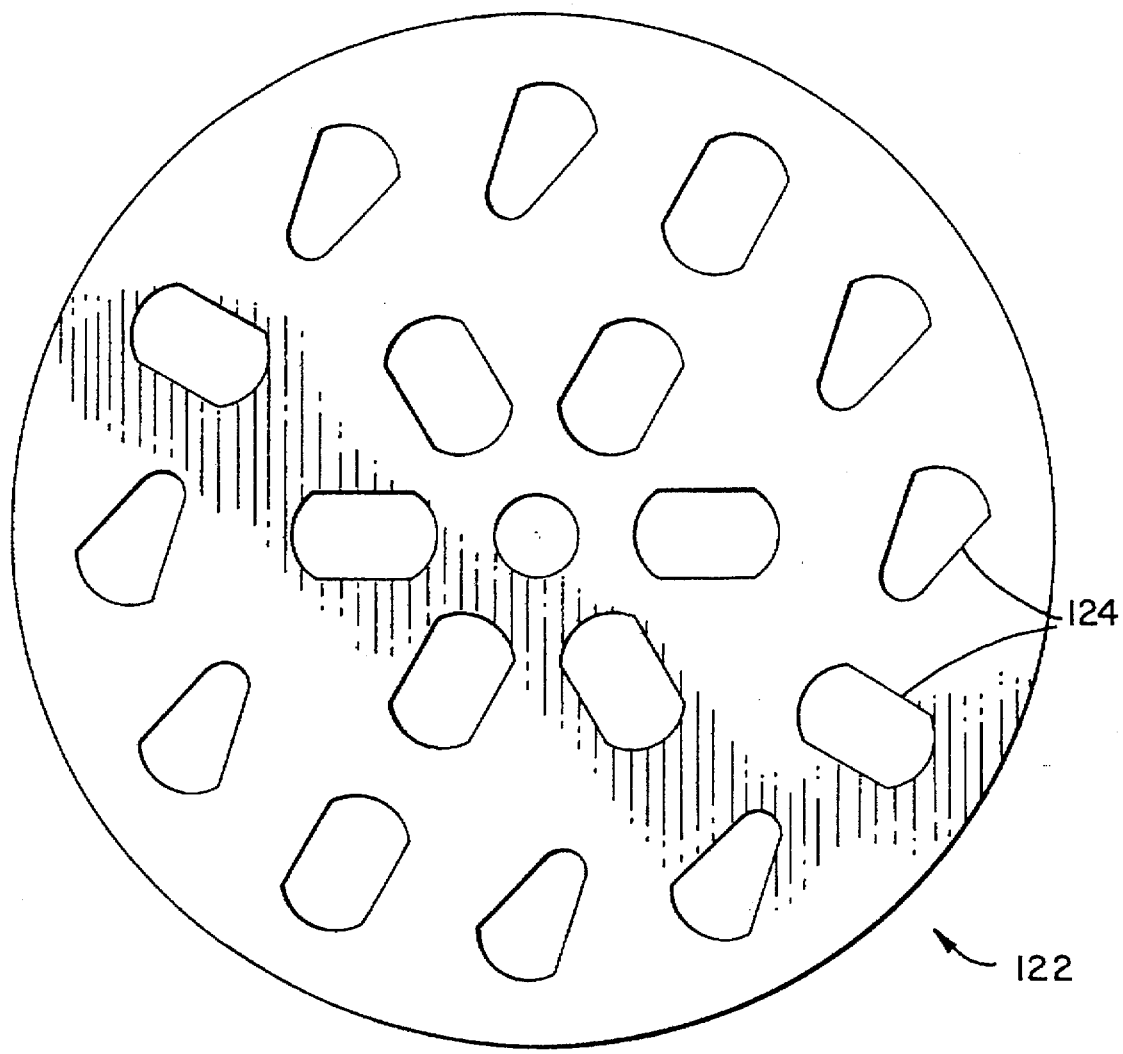
FIG. 14 is a top plan view of a baking substrate sheet of this invention.

As shown in FIG. 14, the sheet 122 has a plurality of die-cut holes 124 and is formed with the dough product in the molding process as described below. The sheet 122 is positioned on the preform 28 prior to pressing the dough into shape. The sheet 122 is smaller in diameter than the preform 28 and hence does not interfere with the locking of the dough to the preform. The paper sheet 122 is thus formed with the crust 22, and the dough of the crust extends through the holes 124 to the preform 28 and locks the sheet 122 to the dough. The end user may thus remove the frozen crust 22 together with the sheet 122 from the preform 28 and place the assembly on an oven rack for baking. As the dough thaws the c rust will loose its stiffness. The sheet 122, however, will prevent the more pliable crust from distending through the oven rack before the dough has become baked and rigid. The sheet 122 forms a backing which restrains flow of the dough, while at the same time the holes 124 permit the escape of gases from the bottom of the crust and ensure uniform baking. The finished baked crust may be removed from the oven with the sheet 122 attached thereto, and the crust may be served directly from the sheet. It should be noted that although a pattern of generally radial slots has been illustrated, alternative patterns of slots, holes, and other shapes may also be used.

Figure 2:
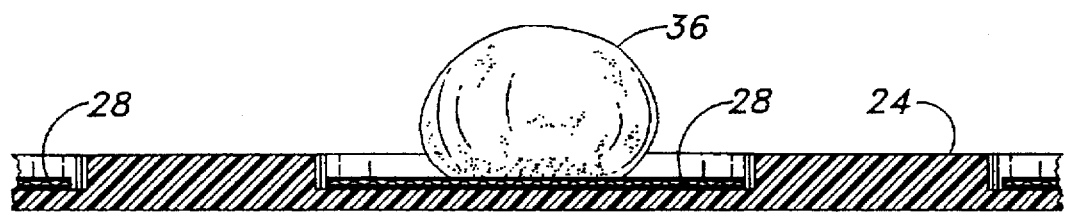
FIG. 2 is a cross-sectional view of the tray of FIG. 1 loaded with corrugated paperboard preforms onto which balls of dough have been placed.

The trays 24 pass from the spray station 32 to a dough deposit station 34, where balls of proofed dough 36 are dropped onto the preforms 28, as shown in FIG. 2. The balls 36 are supplied from a ball former 38 which receives proofed dough from the proofer 40. The ball former 38 and proofer 40 are conventional and well known in the art.

Figure 3:
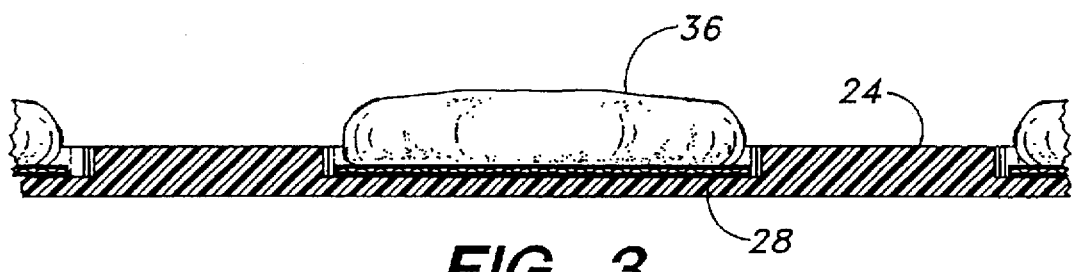
FIG. 3 is a cross-sectional view of the tray of FIG. 2 after the dough balls have been flattened.

The trays 24 may move directly from the dough deposit station 34 to a molding station 42. However, to reduce the travel of the dies 44, the trays 24 preferably pass first through a flattening station 46, where flat plastic blocks reduce the height of the balls of dough 36 by flattening them onto the preforms 28, as shown in FIG. 3.

Figure 4:
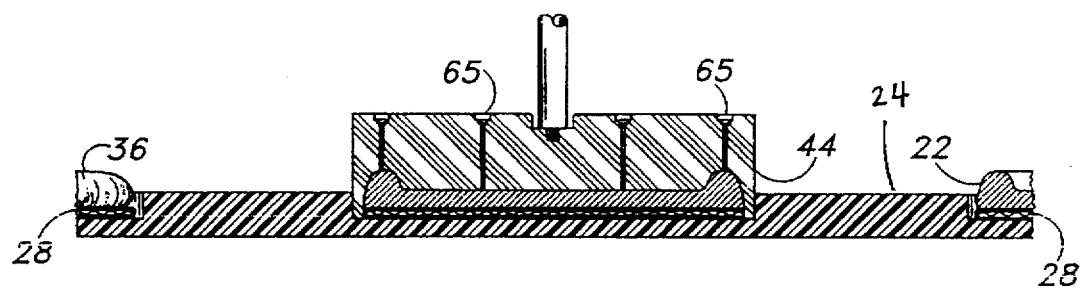
FIG. 4 is a cross-sectional view of the tray of FIG. 3 positioned beneath a plurality of high pressure dough-forming dies.
Figure 5:
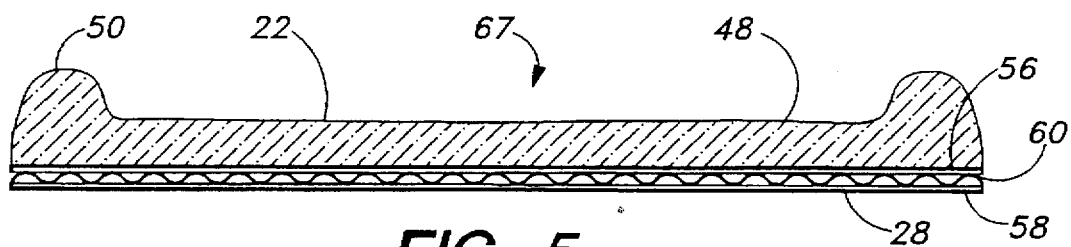
FIG. 5 is a cross-sectional view of the pizza crust and preform of FIG. 4 which has been frozen for shipping and storage prior to baking.
Figure 8:
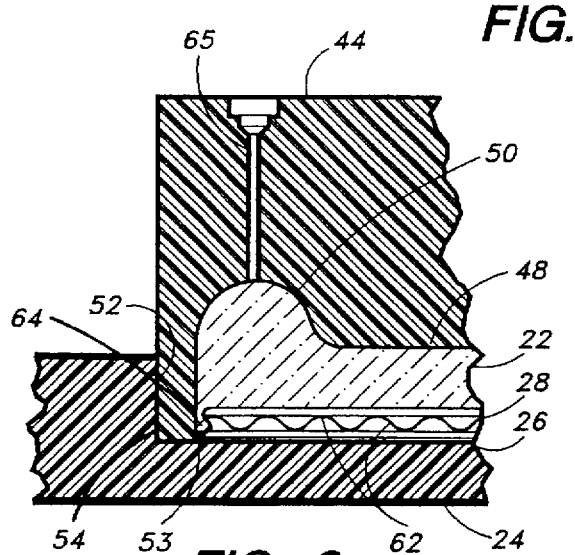
FIG. 8 is a fragmentary cross-sectional view of the dough being formed on the corrugated preform, showing an air-injection hole for facilitating dough release.

As shown in FIG. 4, at the molding station 42, plastic dies 44, mounted on reciprocating hydraulic actuators, move vertically to engage within the openings 26 and to press against the dough ball 36 and form it at pressures in the range of from about 2,500 psi to about 3,200 psi into a desired molded shape. A preferred pressure is about 2,900 psi. As shown in FIG. 8, typically the molded shape will be a flat circular pizza center 48 with an upwardly extending peripheral pizza rim 50. In a preferred embodiment, the preforms 28 are smaller in diameter than the openings 26, to allow a die 44 to extend into the opening between the vertical cylindrical sidewall 52 of the opening 26 and the circular preform 28. A horizontal gap 53 is defined between the downwardly extending lip 54 of the die 44 and the preform 28. The gap 53 is approximately one-eighth of an inch between the preform and the die in a preferred embodiment. The preform 28 is preferably a die-cut corrugated paperboard or cardboard circle. As shown in FIG. 8, the preform 28 is comprised of a top layer of paperboard 56, a bottom layer of paperboard 58, and a central corrugated layer of paperboard 60. The corrugated layer 60 is bent in a generally sinusoidal configuration, and glued to the top and bottom layers 56, 58, to define a plurality of parallel corrugations 62 which open sidewardly from the preform 28. The corrugations 62 provide bulk and stiffness to the preform 28 with reduced weight. However, the process of this invention additionally utilizes the corrugations 62 to secure the dough formed in the die 44 to the preform 28 so that it will retain its desired molded shape once the elevated pressures within the die have been relieved.

Dough typically has elastic properties, and will have a tendency to retract away from the edges of the preform 28. The portions 64 of the dough which are pressed under the high pressure of the molding step into the corrugations 62 retain the pizza rim 50 at the perimeter of the preform 28. The engagement of the dough portions 64 with the sidewardly opening corrugations counteracts the tendency of the dough to retract, and ensures that the desired dough molded shape is maintained until the dough can be frozen.

Once the dough has been molded into a pizza crust 22 air is injected through channels 65 above the pizza rim 50 and the pizza center 48 to facilitate release of the crust 22 from the die 44. The molded crusts 22 are conveyed in the tray 24 from the molding station 42 to a docking station 66 where metal dies form an array of narrow diameter depressions in the formed crust 22. This docking is conventional in the baking industry and facilitates better and more consistent baking and rising.

In a preferred embodiment the trays 24 have an array of four pin holes (not shown) which extend beneath the openings 26 through which ejection pins extend to elevate the cardboard preforms and the raw crusts secured thereto out of the trays. The elevated preform-crust assemblies 67, shown in FIG. 5, may then be manually placed on a cart or rack for transfer to a freezer 68, or they may be transferred to a separate conveyer which leads to a freezer. The crusts 22 may be filled with pizza ingredients prior to entering the freezer if the crusts are intended for purchase by an end consumer, or may be left unfilled if the crusts are intended for pizzeria or other pizza-maker's use.

From the freezer 68 the dough product assemblies 120, consisting of the dough product 22, the baking substrate 122, and the preform 28, are packaged at a packaging station 70, typically by being wrapped in plastic and stacked in boxes for freezer car shipment to the purchaser.

It is important to note that at no time is the crust 22 baked in full or in part. Because the dough is secured to the cardboard preform, it will retain its desired shape as it is conveyed from the molding station to the freezer. By avoiding any baking the flavor and texture of the fresh dough is preserved. In addition, a substantial savings in heating and cooling costs is realized. First, the energy required to bake the molded dough prior to freezing is saved, and second, the energy required to cool down the baked dough is also conserved. Not only is the expense of the added heating and cooling saved, but also the capital expenditures for an oven and a more powerful freezer are eliminated. In addition, Federal Environmental Protection Agency regulations in certain high pollution areas require bakeries to take costly emission abatement measures to address the concern of gas emissions from larger baking ovens. A bakery producing bread products of this invention does not produce the baking gases which are subject to control, and hence eliminates expenses related to compliance. In short, the process of this invention allows not only an improved dough product, but allows that product to be produced at reduced cost.

When it is desired to prepare the crust 22 for consumption, the frozen crust-baking substrate-cardboard preform assembly is removed from the freezer, and the preform is separated from the crust 22 and the baking substrate 122. The frozen crust and engaged baking substrate 122 are placed in an oven and baked in a conventional manner. Because the proofed dough has been frozen without any baking, the yeast within the dough has never been subjected to elevated temperatures which would kill the yeast. Hence, in the baking process the dough will raise a certain amount before being fully baked. The result is a crust which maintains many of the properties of a freshly baked crust, while offering the convenience and transportability of a frozen crust.

During baking, the openings 124 in the baking substrate 122 serve as infrared radiation admitting apertures which allow the radiant heat of the oven to directly strike the dough, thus contributing to the rapid browning of the dough product and a crisper baked product. Prior art prepared dough products which were partially or completely baked prior to being frozen, are relatively stable and uniform when they reach the consumer's oven. The dough product of this invention, however, is first exposed to baking when it is placed, still frozen, into the consumer's oven. If conditions are not optimal in the consumer's oven, there is a risk that a frozen dough product will thaw unevenly prior to baking, and hence result in excessive moisture in some regions of the product. For example, in the pizza crust illustrated, there is a tendency for the outer region to rise and direct moisture to the central region of the crust. To counteract areas of higher moisture, the holes in the baking substrate, as shown in FIG. 14, reveal a greater area of the dough surface beneath the central region, while the holes around the crust periphery are spaced further from one another to block radiant heating. The end result is a more evenly baked bread product.

Figure 15:
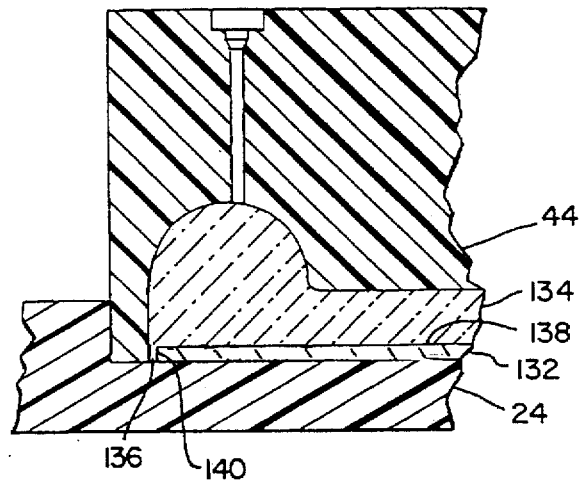
FIG. 15 is a fragmentary cross-sectional view of an alternative embodiment dough product assembly having a non-corrugated preform.

Alternatively, as shown in FIG. 15, a non-corrugated paperboard preform 132 may also be employed in forming the dough products of this invention. The term "paperboard" is used herein to refer to any fibrous paper product, including composite paper articles such as corrugated material, or single uncorrugated paper products. Recycled paperboard, or other stiff paper product may be employed as a preform. Although the non-corrugated preform lacks openings which engage with the formed dough product 134, because the preform is of a diameter less than that of the forming die 44, dough will be extended between the sides of the die and the generally vertical side wall 140 of the preform which extends downwardly from the top surface 138 of the preform. The extended portion of dough 136 locks around the perimeter of the preform, thus preventing the formed dough from retracting inwardly on the top surface 138 of the preform.

Figure 9:
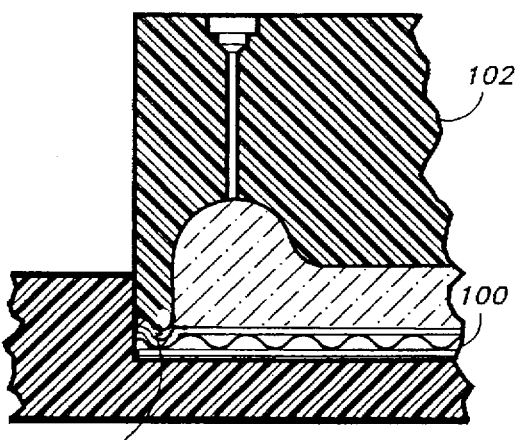
FIG. 9 is a fragmentary cross-sectional view of an alternative embodiment dough-forming die and preform with dough formed thereon of this invention.

An alternative embodiment of the process of this invention employs a preform 100 which is nearly the same diameter as the opening 26 and a molding die 102 at the molding station which has a downwardly protruding rib 104. The rib 104, shown in FIG. 9, is positioned above the preform 100 so that when the die 102 is pressed down into the opening, dough is distributed beneath the rib and is pressed into the preform by the rib. The rib 104 dimples the corrugated preform 100 and locks the dough in place to hold the desired molded shape during transport and freezing of the dough as described above.

Figure 10:
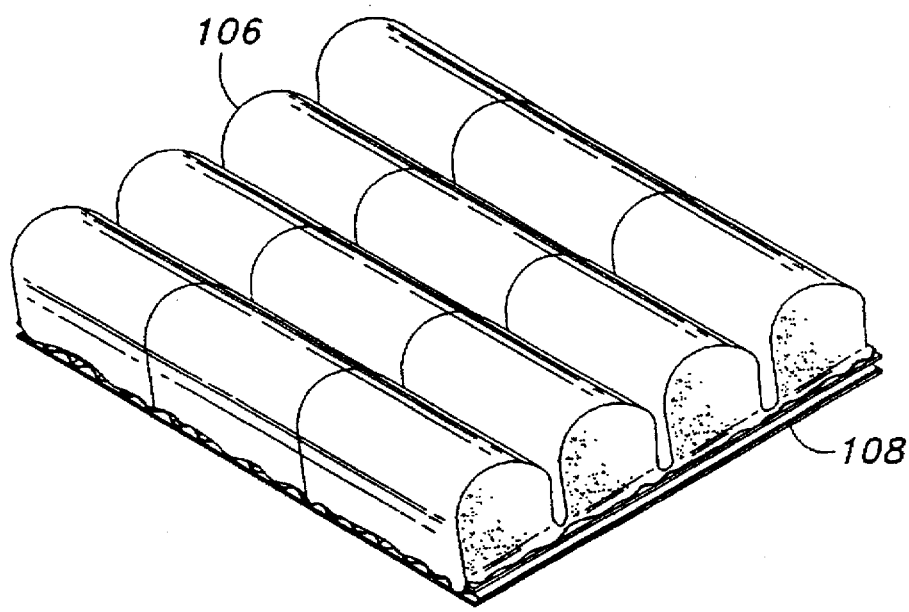
FIG. 10 is an isometric view of an alternative dough product formed in the process of this invention.

It should be noted that, although pizza crusts with raised rims have been illustrated as the dough product produced in the processes of this invention, flat pizza crusts and other types of bread products may also be prepared for freezing. Rolls or buns 106, as shown in FIG. 10, may be molded on a rectangular preform 108. A rectangular baking substrate, not shown, may be positioned between the dough and the preform. Portions of the dough extend into the exposed corrugations of the preform 108 and lock the molded dough in place.

Figure 11:
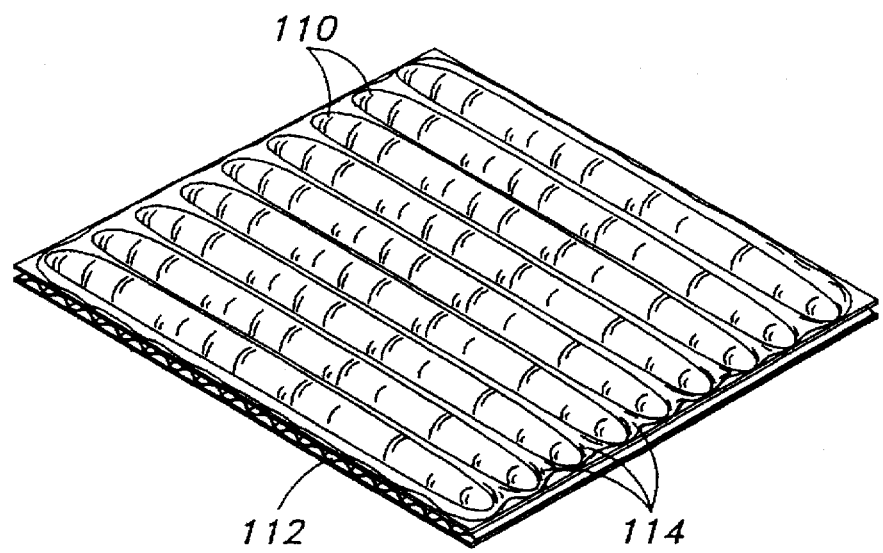
FIG. 11 is an isometric view of another alternative dough product formed in the process of this invention.

As another example, bread sticks 110, shown in FIG. 11, may be formed using the process illustrated in FIG. 9 which employs a die with a rib which depresses portions of the dough into a depression in the preform 112 surrounding the bread product. The bread sticks 110 may be formed on the preform and frozen. Preferably the bread sticks are formed as a single molded shape, with individual sticks joined by a narrow, reduced height, bridge 114 of dough. When it is desired to prepare an individual bread stick, one may be separated from the group by breaking it off along the bridge, and placing it in an oven for baking.

Figure 12:
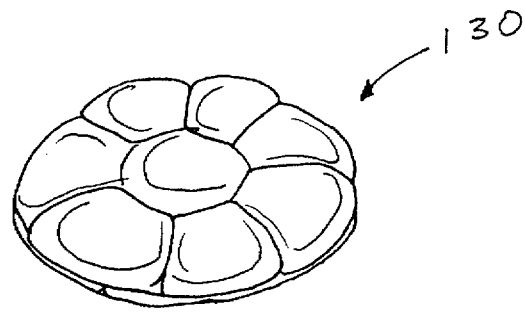
FIG. 12 is a perspective view of another alternative dough product formed in the process of this invention.

Another dough product is shown in FIG. 12. Generally circular rolls 130 may be formed on a circular preform, and may be separated after baking.

It should be noted that bread products and other raised dough products may be formed in the process of this invention using a wide variety of ingredients and dough recipes. Furthermore, preforms of various thickness and shape may be employed, including single and double corrugated paperboard.

It is understood that the invention is not limited to the particular embodiments disclosed and illustrated herein, but embraces such modified forms thereof as come within the scope of the following claims.

We claim:

1. A process for forming dough on a paperboard preform; the process comprising:
   a) positioning a paperboard preform having a perimeter on a platen having an upwardly opening hole with a sidewall, such that the preform is positioned within the hole and a gap is defined between portions of the preform perimeter and the sidewall of the hole;
   b) placing a quantity of raw dough on the preform;
   c) positioning the dough on the preform beneath a die;
   d) pressing the die over the dough to form the dough into a desired shape and to force portions of the dough over the preform into the gap between the preform and the platen sidewall, to thereby lock the formed dough to the preform perimeter; and
   e) freezing the formed dough on the preform without baking the dough.

2. The process of claim 1 further comprising the step of positioning a backing sheet on the preform beneath the dough prior to pressing the die over the dough to thereby mold the backing sheet to the formed dough.

3. The process of claim 2 wherein the backing sheet has portions defining a plurality of holes to allow portions of the dough to extend through the backing sheet.

4. A preformed raw dough assembly, comprising:
   a) a paperboard preform having a top surface and a side wall extending downwardly from the top surface;
   b) a quantity of raw dough positioned on the preform and formed thereon into a desired shape, wherein portions of the dough extend over the top surface and are locked onto the side wall of the preform to secure the dough in the desired shape to the preform.

5. The preformed raw dough assembly of claim 4 further comprising a backing sheet having portions defining a plurality of openings therein, wherein the backing sheet is positioned between the preform and the dough, and wherein the dough extends through said backing sheet holes.

6. A process for forming dough on a paperboard preform; the process comprising:
   a) positioning a paperboard preform on a conveyor within a platen having portions defining a side wall which surrounds the preform;
   b) positioning a perforated sheet of oven-safe paper on the preform;
   c) placing a quantity of raw dough on the perforated sheet, to be supported on the preform;
   c) positioning the dough on the preform beneath a die;
   d) pressing the die over the dough into the platen to form the dough into a desired shape and to secure the dough to the preform; and
   e) freezing the formed dough on the preform without baking the dough.

7. The process of claim 6 wherein the preform is substantially circular, and the dough is formed by the die into a pizza crust with an upwardly extending rim.

8. The process of claim 6 wherein the sheet of oven-safe paper has portions defining a plurality of holes to allow portions of the dough to extend through the sheet.

9. A frozen dough product assembly, comprising:
   a) an oven-safe paper sheet having portions defining a plurality of holes; and
   b) a quantity of formed dough disposed on and engaged with the sheet, wherein the assembly of the dough and the sheet are positionable on a rack within an oven to permit baking of the dough and to restrict deformation of the dough by the rack.

10. The assembly of claim 9 wherein the formed dough has a downwardly facing surface which is engaged with the sheet, and wherein the downwardly facing surface has an outer region which surrounds an inner region, and wherein the holes in the sheet are positioned to expose a greater percentage of the inner region than of the outer region, to thereby disproportionately heat the inner region when exposed to baking.

11. A preformed dough assembly, comprising:
   a) a supportive preform having a top surface;
   b) an oven-safe sheet positioned on the supportive preform and having portions defining a plurality of holes; and
   b) a quantity of dough positioned on the preform to overlie the oven-safe sheet and formed thereon into a desired shape, wherein potions of the dough extend over the top surface and are locked onto the side wall of the preform to secure the dough in the desired shape to the preform, and wherein the quantity of dough and sheet are separable from the preform for baking within an oven.

* * * * *